Patented July 9, 1940

2,207,045

UNITED STATES PATENT OFFICE 2,207,045

PRODUCTION OF AMINOANTHRAQUINONE COMPOUNDS

Richard S. Wilder, Hamburg, N. Y., assignor to National Aniline & Chemical Company, Inc., New York, N. Y., a corporation of New York No Drawing. Application March 28, 1938, Serial No. 198,488

13 Claims. (Cl. 260—378)

This invention relates to an improvement in the process for the manufacture of aminoanthraquinone compounds, and more particularly to an improvement in the oxidation step of the process of preparing aminoanthraquinone compounds which contain an unsubstituted or a substituted amino radical in the 1-position and an amino radical of this class or a hydroxyl radical in the 4-position of the anthraquinone nucleus from leuco - 1,4 - dihydroxyanthraquinone compounds and leuco-1,4-diaminoanthraquinone compounds. These aminoanthraquinone compounds may be free from further substituents or may contain additional substituents in the 5-, 6-, 7-, or 8-positions of the anthraquinone nucleus.

Aminoanthraquinone compounds of the above class are valuable products, being useful as dyes and as intermediates in the production of dyes. Thus, 1,4-diaminoanthraquinone compounds in which the amino radicals are unsubstituted or contain alkyl radicals (i. e., aliphatic chains, cycloalkyl radicals or aralkyl radicals) are among the most valuable dyestuffs for the coloring of materials comprising organic derivatives of cellulose (such as, acetyl cellulose); and the 1,4-diaminoanthraquinone compounds in which at least one of the amino radicals contains an aryl radical are valuable as intermediates; e. g., upon sulfonation, they yield acid wool dyestuffs.

An important process for the manufacture of these aminoanthraquinone compounds involves reacting a leuco - 1,4 - dihydroxyanthraquinone compound, such as leuco-quinizarine, with ammonia or with an amine such as an alkylamine, arylamine, or a heterocyclic amine so as to replace one or both of the hydroxyl radicals with a substituted or unsubstituted amino radical. For example, as pointed out in my United States application Serial No. 92,024, filed July 22, 1936, which has matured into Patent No. 2,112,258 of which the present application is a continuation-in-part, when it is desired to obtain a 1-alkylamino-4-hydroxyanthraquinone compound, the leuco-quinizarine or other leuco-1,4-dihydroxyanthraquinone compound can be reacted with a monomolecular proportion of an alkylamine containing at least two carbon atoms to replace one hydroxyl radical with the residue of the amine. As further pointed out in my application, unsymmetrical 1,4 - di(alkylamino) anthraquinone compounds can be prepared by reacting a leuco-1,4-dihydroxyanthraquinone compound successively with different alkylamines corresponding to the alkylamino radicals which it is desired to substitute for the hydroxyl radicals in the 1- and 4-position of the anthraquinone nucleus. 1,4-diaminoanthraquinone compounds and 1-amino-4-hydroxyanthraquinone compounds can be similarly prepared with the use of amines containing aryl and heterocyclic radicals. Another important method for the preparation of 1,4-diaminoanthraquinone compounds involves reacting a leuco-1,4-diaminoanthraquinone compound in which the amino radicals are unsubstituted, with one or two molecular proportions of an organic amine, for example, an amine containing an alkyl radical (i. e., aliphatic chain, or a cycloalkyl or aralkyl radical), an aryl radical, or a heterocyclic radical so as to introduce the residue of the amine into the 1- and/or 4-position of the anthraquinone nucleus.

In any of the above procedures at the completion of the amination reaction, there is obtained an aminoanthraquinone compound in the reduced or leuco form. In order to produce the finished dyestuff or intermediate, it is necessary to convert this leuco-aminoanthraquinone compound by oxidation to the corresponding aminoanthraquinone compound. The manner in which a leuco-aminoanthraquinone compound is oxidized to the corresponding aminoanthraquinone compound has an important effect on the efficiency of the process from the standpoint of the quality and yield of the product obtained and also from the standpoint of economy of operation. Various ways of carrying out this conversion have been employed. For example, it has been proposed to oxidize certain leuco-anthraquinone compounds by heating them with air in the presence of absence of caustic soda, but such a process is not always practical or effective, for example it yields poor results when applied to the oxidation of leuco - 1,4 - diaminoanthraquinone. Also, it has been proposed to oxidize leuco compounds by boiling them in nitrobenzene in the presence of air, and by heating them to 140° to 180° C. with a substance yielding oxygen, such as nitrobenzene, in the presence of an acid catalyst or an organic amine. These proposals are characterized by various disadvantages; such as the high temperatures required, the length of time necessary to effect reasonably complete conversion, the expense of operation, and others. Further, the researches leading to the development of the present invention have indicated that the quality and yields of products resulting from the practice of these former procedures are not as high as could be desired.

It is an object of the present invention to provide an improvement in the process for the manufacture of 1,4-diaminoanthraquinone and 1 - amino - 4 - hydroxyanthraquinone compounds whereby such compounds may be obtained of excellent quality and in an efficient manner. Another object of the invention is to provide a process of converting leuco-1,4-diaminoanthraquinone and leuco-1-amino-4-hydroxyanthraquinone compounds to the corresponding aminoanthraquinone and aminohydroxyanthraquinone compounds which can be carried out at low temperatures or may extend over a relatively short period of time. A more specific object of the invention is to provide a process for converting leuco - 1, 4 - di(alkylamino) anthraquinone compounds in which the alkyl radicals attached to the amino nitrogen atoms in the 1- and 4-positions are different radicals, and leuco-1-alkylamino-4-hydroxyanthraquinone compounds to the corresponding aminoanthraquinone compounds, the said process being characterized by the fact that products are obtained which yield pure shades when applied to materials comprising organic derivatives of cellulose, such as acetyl cellulose.

Other objects of the invention will in part be obvious and will in part appear hereinafter.

It has been found in accordance with the present invention that aminoanthraquinone compounds which contain an amino radical in the 1-position and an amino radical or a hydroxyl radical in the 4-position of the anthraquinone nucleus of excellent quality, being superior in this respect to the products obtained by known procedures, can be obtained by oxidizing leuco-1, 4-diaminoanthraquinone and leuco-1-amino-4-hydroxy-anthraquinone compounds with a mixture of an aromatic nitro compound and an alkali-metal hydroxide. The oxidation is preferably carried out while the leuco compound is in solution or suspension in an organic solvent such as an alcohol. It has been found that the process can be carried out under mild reaction conditions (that is, in a short period of time or at a relatively low temperature; for example, at ordinary atmospheric temperatures) and yet the products are substantially completely oxidized.

As before indicated, the products obtained as a result of this procedure are especially characterized by their excellent quality. Thus it has been found that the products obtained as a result of oxidizing a leuco compound of the above class in solution or suspension in alcohol with a mixture of an aromatic nitro compound and an alkali-metal hydroxide are noticeably superior in quality to the products obtained when using an aromatic nitro body alone or an alkali-metal hydroxide alone. Further, when proceeding in accordance with the present invention, it is possible to employ ordinary temperatures when the time of reaction is not a controlling consideration. On the other hand, when relatively high temperatures are maintained, the oxidation is completed in a relatively short time. While the reasons for the results obtainable by practicing the present process have not been fully determined, it appears probable that the improved quality of the products is due to the fact that they are relatively free from undesirable decomposition products and occluded incomplete oxidation products. The substantial absence of decomposition products appears to result from the fact that the oxidation can be effected at relatively low temperatures or in a relatively short period of time, and the substantial absence of incomplete oxidation products may be explained by the fact that a mixture of an aromatic nitro compound and an alkali-metal hydroxide is a remarkably efficient oxidation medium in the present instance.

Various types of 1,4-diaminoanthraquinone compounds and 1-amino-4-hydroxyanthraquinone compounds of improved quality and in excellent yields can be prepared by following the process of the present invention. For example, the process can be employed to produce compounds of this class in which the amino radical or radicals are unsubstituted or in which the amino radical or radicals contain substituents of varied classes, including the unsubstituted amino radical; the hydroxyl radical; alkyl radicals, such as, methyl, ethyl, amyl, benzyl, phenylethyl, hydroxy ethyl, and cyclohexyl radicals; aryl radicals, such as, phenyl, tolyl, xylyl, anisidyl, aminophenyl, aminodiphenyl, naphthyl, and pyrene radicals; and heterocyclic radicals, such as pyridyl, quinolyl and acridyl radicals. As appears from the foregoing, the alkyl, aryl, and heterocyclic radicals may be unsubstituted or may contain substituents, such as, for example, halogen and hydroxyl, alkyl, alkoxyl, amino, and substituted amino radicals. As specific examples of aminoanthraquinone compounds which can be prepared by the present process the following are mentioned: 1,4 - diaminoanthraquinone; 1,4 - di(monomethylamino) anthraquinone; 1,4 - di-(monoethylamino) anthraquinone; 1,4-di(monoethanolamino) anthraquinone; 1,4-di(monobenzylamino) anthraquinone; 1,4 - di(monocyclohexylamino) anthraquinone; 1,4 - di(monobeta-naphthylamino) anthraquinone; 1,4-di(para-anisidino) anthraquinone; 1,4 - di(monoquinonyl-amino) anthraquinone; 1 - monoethylamino - 4 - monomethylamino-anthraquinone; 1-monoamyl-amino-4-monomethylamino-anthraquinone; 1-monobenzylamino-4-monomethylamino - anthraquinone; 1 - monoethylamino-4-para-toluidino-anthraquinone; 1-monomethylamino- or 1-monoethylamino- or 1-monoamylamino- or 1-monobenzylamino - 4 - hydroxyanthraquinone; 1 - para-toluidino-4-para-anisidino - anthraquinone, etc. Further, 1,4-diaminoanthraquinone and 1-amino-4-hydroxyanthraquinone compounds of the above type containing in the 5-, 6-, 7-, and 8-positions additional substituents, such as, for example, halogen and hydroxyl, alkyl, alkoxy, amino, and substituted amino radicals, can be prepared by conversion of the corresponding leuco compounds. It will be understood of course that the advantages resulting from the use of the present process vary in some degree, depending upon the particular leuco compound subjected to oxidation. These advantages are particularly noticeable in the cases of leuco-aminoanthraquinone compounds which are difficult to oxidize.

In proceeding in accordance with the present process, the leuco-aminoanthraquinone compound can be brought into reactive contact with the aromatic nitro compound and the alkali-metal hydroxide in several ways. For example, the leuco-aminoanthraquinone compound can be mixed with the aromatic nitro compound, and the alkali-metal hydroxide, which is conveniently in the form of an aqueous solution, can then be added. The oxidation reaction is effected by maintaining the mixture at a reactive temperature while agitating. The temperature maintained in each case is primarily dependent upon whether the time of reaction is an important consideration. It has been found that the reaction can be carried out at ordinary temperatures by maintaining the reaction mixture at such temperatures for a period of the order of five to twenty-four hours. On the other hand, if a shorter reaction period is desired, it has been found that by raising the temperature, the reaction period may be correspondingly shortened.

Although the reaction can be carried out in a mixture containing only the hydro compound, the aromatic nitro compound, and the alkali-metal hydroxide, as a feature of the present invention, it has been found to be preferable to carry out this reaction in the presence of a suitable organic solvent, which appears to assist in bringing the materials into reactive contact. The reaction between a leuco-1,4-dihydroxyanthraquinone compound and ammonia to produce a leuco-diaminoanthraquinone compound, and the reactions between a leuco-1,4-dihydroxy anthraquinone, or a leuco-1-amino-4-hydroxyanthraquinone, or a leuco-1,4-diaminoanthraquinone and an organic amine, to form the corresponding leuco-aminoanthraquinone compounds are frequently carried out in a solvent such as an alcohol. In such cases the aromatic nitro compound and the alkali-metal hydroxide can be added directly to the amination reaction mixture. The resulting mixture is then maintained at a temperature adapted to cause oxidation to take place in the desired manner which, as above stated, may be ordinary atmospheric temperature or a higher temperature. With a view to the obtainment of products of exceptional purity, however, it has been found to be preferable to remove the leuco-aminoanthraquinone compound from the amination reaction mixture in the reduced condition and then to form a solution or suspension of this compound in the selected organic solvent; the addition of the aromatic nitro compound and the alkali-metal hydroxide being made to the solution or suspension. The oxidized product obtained after completion of the oxidation reaction is insoluble and can be separated from the mixture conveniently by filtration. After washing and drying the filter cake of the aminoanthraquinone compound, the compound obtained is of excellent quality.

Aromatic nitro compounds, in general, are adapted for use in the process. While it has been found that the reaction proceeds with particular efficiency when nitrobenzene is used, other aromatic nitro compounds can be used if desired. For example, other nitro compounds of the benzene series (i. e., containing a single benzene nucleus) such as nitrotoluene, nitroxylene, nitrophenol, etc., and of other series; e. g., nitronaphthalene, can be used in this connection. The amount of the aromatic nitro compound required in the process in cases where an organic solvent is used is ordinarily at least one-half mol for each mol of the leuco-aminoanthraquinone compound subjected to treatment. When an added solvent is not employed, ordinarily a greater quantity of the aromatic nitro compound is preferable in order to improve the workability of the reaction mixture; in this case, the aromatic nitro compound acting as a solvent as well as performing the oxidizing function.

The amount of alkali-metal hydroxide; i. e., sodium hydroxide or potassium hydroxide, required to achieve the improved results of the present process is relatively small. For example, this material may be employed with effective results in proportions as low as one per cent or even less, based on the weight of the leuco-aminoanthraquinone compound subjected to treatment. Although in general an excess of this material does not have a critical effect on the operativeness of the process, an excess is not desirable for economic reasons. The alkali-metal hydroxide may be employed in the solid form, but it is preferably employed in the form of an aqueous solution in order to facilitate its contact with the other reacting materials.

Although water-soluble alcohols are particularly adapted for use as the organic solvent in the process, any organic solvent which does not adversely affect the reaction and in which the leuco-aminoanthraquinone compound, the aromatic nitro compound, and the alkali-metal hydroxide are soluble to some extent can be used. Such solvents are referred to herein as "suitable organic solvents". The relative value of the organic solvents is dependent principally upon their miscibility with the reacting ingredients. Thus the preferred solvents are those which are miscible with the aromatic nitro compound and aqueous caustic alkali. For this reason the water-soluble alcohols such as methyl, ethyl, propyl, butyl, and iso-amyl alcohol; dioxane; glycols; and glycerol are especially valuable. Other solvents which are of interest in this connection are chlorbenzene, dichlorbenzene, and aromatic amines. When relatively immiscible solvents are used, such as those last mentioned, vigorous agitation of the reacting mass is essential to assure intimate mixing and dispersion of the caustic alkali throughout the mass so as to effect the necessary contact of the reacting materials.

In order that the invention may be more fully understood, reference should be had to the following examples in which are described typical reactions coming within the scope of the invention. It will be understood of course that these examples are given for illustrative purposes merely and are not intended as limitations of the invention. The parts are by weight and the temperatures are in degrees centigrade.

*Example 1.*—In a suitable vessel fitted with an agitator and reflux condenser, a mixture of 25 parts of leuco-1,4-diaminoanthraquinone and 200 parts of specially denatured alcohol 2B (U. S. specially denatured alcohol, Formula 2B) was stirred while 30 parts of nitrobenzene and 5 parts of 50 per cent aqueous caustic soda were added. The color of the mixture began to change immediately from yellowish-brown to a violet. The mixture was heated to its refluxing temperature (about 80°) and boiled for about 1½ hours. It was then cooled to 30°, filtered and the filter cake of 1,4-diaminoanthraquinone was washed with 100 parts of denatured alcohol 2B and dried. The yield was 22.3 parts of a dark violet crystalline product which dyed cellulose actate silk a much stronger, purer and brighter shade of reddish-violet than the shade obtainable with the product resulting from oxidizing the same leuco-1,4 - diaminoanthraquinone with nitrobenzene alone.

*Example 2.*—A mixture of 200 parts of leuco-quinizarine, 1000 parts of specially denatured alcohol 2B, and 200 parts of a 30 per cent aqueous solution of monomethylamine was agitated and boiled under a reflux condenser for about 2 hours. It was then cooled and filtered. The cake of leuco - 1,4 - di(monomethylamino)anthraquinone was washed with 200 parts of specially denatured alcohol 2B and transferred to 1400 parts of specially denatured alcohol 2B to which 120 parts of nitrobenzene and 16 parts of a 50 per cent by weight aqueous solution of caustic soda were added. By means of a hot water bath, the mixture was maintained at a temperature of about 80° for about one hour, then it was cooled and filtered. The cake of 1,4-di(monomethylamino)anthraquinone was washed with 250 parts of specially denatured alcohol 2B, then with warm water, and dried in air at about 90°. The yield of product was 190 parts. The product dyed cellulose acetate blue shades. As compared with commercial products and with 1,4-di(monoethylamino)anthraquinone prepared by an oxidation of leuco compound without the addition of caustic soda, the product of this example was distinctly superior because of the brighter and greener shade of blue which it imparted to the cellulose acetate dyed therewith.

Example 3.—A mixture of 240 parts leuco-1,4-diaminoanthraquinone, 62 parts nitrobenzene, 1600 parts specially denatured alcohol 2B, and 15.3 parts of aqueous caustic soda solution containing 50 per cent of its weight of sodium hydroxide was heated under reflux to about 80° for about 2 hours. The mixture was cooled to about 30°, filtered, and the filter cake was washed with 1600 parts specially denatured alcohol 2B, then with warm water. The washed cake when dry weighed 218 parts. The dry product was substantially pure 1,4-diaminoanthraquinone and was the same as that obtained in Example 1.

Example 4.—A mixture of 100 parts leuco-quinizarine, 300 parts of methyl alcohol and 45 parts mono-amylamine was agitated vigorously and boiled for 2 hours in a flask fitted with a reflux condenser. The mixture was cooled to about 25°, filtered, and the filter cake was washed free of adhering mother liquor with methyl alcohol.

The cake was transferred to 700 parts of specially denatured alcohol 2B to which 60 parts of nitrobenzene and 8 parts of aqueous caustic soda containing 50 per cent of its weight of sodium hydroxide were added. By means of a hot water bath the mixture was maintained at a temperature of about 80° for about one hour, then it was cooled and filtered. The cake of 1-mono-amyl-amino-4-hydroxyanthraquinone was washed with 250 parts of specially denatured alcohol 2B, then with warm water; finally it was dried in air at about 90°. The product dyed cellulose acetate a bright red violet shade.

Example 5.—A mixture of 100 parts leuco-quinizarine, 150 parts of a 25 per cent by weight aqueous solution of mono-ethylamine, and 800 parts specially denatured alcohol 2B were heated under a reflux condenser to about 80° for about 1½ hours. To the resulting mixture 60 parts nitrobenzene and 8 parts of aqueous caustic soda, containing 50 per cent of its weight of sodium hydroxide, were added, and heating was continued for about 2 hours. After being cooled to about 25° to 30°, the mixture was filtered, the filter cake was washed with specially denatured alcohol 2B and a little water, and dried. The dry product was substantially 1-monoethylamino-4-hydroxyanthraquinone and weighed 91 parts. It dyed cellulose acetate a bright violet shade.

Example 6.—48 parts of leuco-1,4-diaminoanthraquinone, 400 parts of specially denatured alcohol 2B, and 25 parts of methylamine in saturated aqueous solution were refluxed at about 80° for 4 hours. To this mixture, cooled to about 60°, 36 parts of nitrobenzene and 3 parts of a 50 per cent aqueous solution of caustic soda were added and the whole was boiled for 1½ hours, then cooled to 30°, and then filtered. The resulting filter cake was washed with 160 parts of specially denatured alcohol 2B and then with water to remove organic solvents. The wet cake contained 36.6 parts of 1-amino-4-methylamino-anthraquinone of excellent quality.

The foregoing examples are particularly illustrative of the manner of carrying out the present process at temperatures above ordinary atmospheric temperature. In such cases, as appears from the examples, the oxidation is ordinarily complete in from one to two hours. Substantially equivalent results can be obtained by carrying out the process at ordinary atmospheric temperatures (e. g., 20° C.) and extending the reaction period. In either case the reaction conditions are relatively mild due to the short reaction period or low temperature, thereby avoiding the formation of decomposition products.

Other 1,4-diaminoanthraquinone and 1-amino-4-hydroxyanthraquinone compounds, such as those previously mentioned, of improved quality can be prepared by following the procedures illustrated in the examples. For example, by proceeding in accordance with the procedure of Example 2, but using an equivalent quantity of mono-ethanolamine in place of the mono-methylamine, 1,4-di(monoethanolamino)anthraquinone has been prepared; the product so obtained is superior as a dyestuff for acetyl cellulose to the structurally identical products which are commercially available or are produced with the use of nitrobenzene alone.

It will be understood, of course, that the other conditions disclosed in the examples can be varied widely within the scope of the invention: thus the nitrobenzene can be replaced by another aromatic nitro compound, for example, one of those mentioned; the amount of sodium hydroxide used can be varied and/or this material can be replaced by potassium hydroxide; and another suitable organic solvent of the class previously disclosed can replace the alcohol or the use of a solvent can be dispensed with, although this is not preferred because the solvent assists in moderating the reaction and assuring intimate contact of the reacting materials.

I claim:

1. The process for converting a leuco-aminoanthraquinone compound containing an amino radical in the 1-position of the anthraquinone nucleus and in the 4-position a radical selected from the group consisting of amino radicals and the hydroxyl radical to the corresponding aminoanthraquinone compound which comprises oxidizing the leuco-aminoanthraquinone compound with a mixture of an aromatic nitro compound and an alkali-metal hydroxide, whereby the corresponding aminoanthraquinone compound is obtained.

2. The process for converting a leuco-aminoanthraquinone compound containing an amino radical in the 1-position of the anthraquinone nucleus and in the 4-position a radical selected from the group consisting of amino radicals and the hydroxyl radical to the corresponding aminoanthraquinone compound which comprises oxidizing the leuco-aminoanthraquinone compound with a mixture of an aromatic nitro compound and an alkali-metal hydroxide in the presence of an organic solvent in which the leuco-aminoanthraquinone compound, the aromatic nitro compound and the alkali-metal hydroxide are soluble, and which does not adversely affect the oxidation reaction, whereby the corresponding aminoanthraquinone compound is obtained.

3. The process for converting a leuco-aminoanthraquinone compound containing an amino radical in the 1-position of the anthraquinone nucleus and in the 4-position a radical selected from the group consisting of amino radicals and the hydroxyl radical to the corresponding aminoanthraquinone compound which comprises oxidizing the leuco-aminoanthraquinone compound with a mixture of an aromatic nitro compound of the benzene series and an alkali-metal hydroxide in the presence of a water-soluble alcohol, whereby the corresponding aminoanthraquinone compound is obtained.

4. The process for converting a leuco-aminoanthraquinone compound containing an amino radical in the 1-position of the anthraquinone nucleus and in the 4-position a radical selected from the group consisting of amino radicals and the hydroxyl radical to the corresponding aminoanthraquinone compound which comprises oxidizing the leuco-aminoanthraquinone compound with a mixture of an aromatic nitro compound of the benzene series and an aqueous solution of sodium hydroxide in the presence of a water-soluble alcohol, and recovering the resulting aminoanthraquinone compound.

5. The process for converting a leuco-aminoanthraquinone compound containing an amino radical in the 1-position of the anthraquinone nucleus and in the 4-position a radical selected from the group consisting of amino radicals and the hydroxyl radical to the corresponding aminoanthraquinone compound which comprises oxidizing the leuco-aminoanthraquinone compound with a mixture of nitrobenzene and a small amount of an aqueous solution of sodium hydroxide in the presence of a water-soluble alcohol, and recovering the resulting aminoanthraquinone compound.

6. The process for converting a leuco-aminoanthraquinone compound containing an amino radical in the 1-position, a radical selected from the group consisting of amino radicals and the hydroxyl radical in the 4-position, and being free from substituents in the remaining positions of the anthraquinone nucleus to the corresponding aminoanthraquinone compound which comprises oxidizing the leuco-aminoanthraquinone compound with a mixture of an aromatic nitro compound of the benzene series and an alkali-metal hydroxide, whereby the corresponding aminoanthraquinone compound is obtained.

7. The process for converting a leuco-aminoanthraquinone compound containing an amino radical in the 1-position, a radical selected from the group consisting of amino radicals and the hydroxyl radical in the 4-position, and being free from substituents in the remaining positions of the anthraquinone nucleus to the corresponding aminoanthraquinone compound which comprises heating the leuco-aminoanthraquinone compound with a mixture of an aromatic nitro compound of the benzene series, a small amount of an aqueous solution of an alkali-metal hydroxide, and a water-soluble alcohol at a temperature of about 80° C. until the leuco-aminoanthraquinone compound is oxidized to the corresponding aminoanthraquinone compound.

8. The process for converting a leuco-aminoanthraquinone compound containing an alkylamino radical in the 1-position and in the 4-position of the anthraquinone nucleus to the corresponding aminoanthraquinone compound which comprises oxidizing the leuco-aminoanthraquinone compound to the corresponding aminoanthraquinone with a mixture of an aromatic nitro compound and an alkali-metal hydroxide, whereby the corresponding aminoanthraquinone compound is obtained.

9. The process for converting a leuco-aminoanthraquinone compound containing an alkylamino radical in the 1-position and in the 4-position and being free from substituents in the remaining positions of the anthraquinone nucleus to the corresponding aminoanthraquinone compound which comprises oxidizing the leuco-aminoanthraquinone compound with a mixture of nitrobenzene and a small amount of an aqueous solution of sodium hydroxide in the presence of a water-soluble alcohol, whereby the corresponding aminoanthraquinone compound is obtained.

10. The process for converting a leuco-aminoanthraquinone compound containing an alkylamino radical in the 1-position and the hydroxyl radical in the 4-position of the anthraquinone nucleus to the corresponding amino-anthraquinone compound which comprises oxidizing the leuco-aminoanthraquinone compound with a mixture of an aromatic nitro compound and an alkali-metal hydroxide, whereby the corresponding aminoanthraquinone compound is obtained.

11. The process for converting a leuco-aminoanthraquinone compound containing an alkylamino radical in the 1-position, the hydroxyl radical in the 4-position, and being free from substituents in the remaining positions of the anthraquinone nucleus to the corresponding aminoanthraquinone compound which comprises oxidizing the leuco-aminoanthraquinone compound with a mixture of nitrobenzene and a small amount of an aqueous solution of sodium hydroxide in the presence of a water-soluble alcohol, whereby the corresponding aminoanthraquinone compound is obtained.

12. In the process of preparing an aminoanthraquinone compound from a leuco-1,4-dihydroxyanthraquinone compound by reacting the leuco - 1,4 - dihydroxyanthraquinone compound with a member selected from the group consisting of ammonia and amines to form an amination reaction mixture containing a leuco-aminoanthraquinone compound containing an amino radical in the 1-position of the anthraquinone nucleus and in the 4-position a radical selected from the group consisting of amino radicals and the hydroxyl radical, the improvement which comprises recovering the leuco-aminoanthraquinone compound from the amination reaction mixture, and oxidizing the recovered leuco-aminoanthraquinone compound with a mixture of nitrobenzene and a small amount of an aqueous solution of sodium hydroxide in the presence of a water-soluble alcohol.

13. In the process of preparing an aminoanthraquinone compound from a leuco-1,4-diaminoanthraquinone compound in which the amino radicals in the 1- and 4-positions are unsubstituted by reacting the leuco-1,4-diaminoanthraquinone compound with an amine to form an amination reaction mixture containing a leuco - 1,4 - diaminoanthraquinone compound in which at least one of the amino radicals in the 1- and 4-positions of said first-mentioned leuco-1,4-diaminoanthraquinone compound has been replaced by the residue of the amine, the improvement which comprises recovering said last-mentioned leuco - 1,4 - diamino anthraquinone compound from the amination reaction mixture, and oxidizing the recovered leuco-1,4-diaminoanthraquinone compound to the corresponding 1,4-diaminoanthraquinone compound with a mixture of nitrobenzene and a small amount of an aqueous solution of sodium hydroxide in the presence of a water-soluble alcohol.

RICHARD S. WILDER.